United States Patent [19]

Savello

[11] Patent Number: 5,762,989
[45] Date of Patent: Jun. 9, 1998

[54] METHOD FOR MANUFACTURING YOGURT MILK/ADDITIVE BLENDS BY REVERSE OSMOSIS CONCENTRATION AND ULTRA-HIGH TEMPERATURE PROCESSING

[75] Inventor: Paul A. Savello, Hyde Park, Utah

[73] Assignee: Utah Milk Technologies, L.C., Delta, Utah

[21] Appl. No.: 695,694

[22] Filed: Aug. 12, 1996

[51] Int. Cl.⁶ .................................................. A23C 9/00
[52] U.S. Cl. .......................... 426/583; 426/34; 426/580; 426/492; 426/522
[58] Field of Search .................... 426/34, 42, 43, 426/580, 583, 490, 492, 520, 491, 521, 522

[56] References Cited

PUBLICATIONS

Taketomo et al., Patent Abstracts of Japan, Abstracting JP 58–187133, Nov 1983.
83(10): P1480 FSTA, United Kingdom , Dairy Trade Federation, London, UK, 1983, abstract only.

Tamime et al., Yoghurt Science and Technology, Pergamon Press, Oxford, 1985, pp. 19–25, 237, 255, 256, and 271–275.

*Primary Examiner*—Leslie Wong
*Attorney, Agent, or Firm*—K. S. Cornaby

[57] ABSTRACT

Methods are disclosed for the manufacturing of concentrated and commercially-sterile forms of yogurt milk mix/additive blends that can be stored at room temperature for several months without microbiological, physical, or chemical changes. Reverse osmosis concentration of fat-adjusted milk creates the yogurt milk mix with the appropriate and desired fat and nonfat milk solids levels. Food substances/additives that are desired in the final yogurt product are added at appropriate level(s) to the concentrated form of yogurt milk mix to produce a yogurt milk mix/additive blend. The yogurt milk mix/additive blend is ultra-high temperature processed and aseptically-packaged to create a commercially-sterile yogurt mix/milk additive blend that can be stored at room temperature until use in the manufacture of yogurt products.

8 Claims, 1 Drawing Sheet

METHOD FOR MANUFACTURING YOGURT MILK/ADDITIVE BLENDS BY REVERSE OSMOSIS CONCENTRATION AND ULTRA-HIGH TEMPERATURE PROCESSING

FIELD OF THE INVENTION

The invention relates to an improved method to concentrate and heat-process milk to commercial sterility for use in the manufacture of yogurt products. The concentrated, commercially-sterile milk can keep at room temperature for several months without microbiological physical or chemical changes. The concentrated, commercially-sterile milk can be adjusted to a desired total milk solids level by addition of water and fermented by appropriate lactic acid bacterial cultures to manufacture yogurt. Specifically, the method comprises concentrating milk by reverse osmosis, addition of desired food additives/substances used in yogurt manufacture, commercially sterilizing the blend to ultra-high temperature conditions, homogenizing, aseptically packaging the concentrate/blend for room temperature storage, and reconstituting the concentrate with water to manufacture yogurt of desired viscosity and physico-chemical properties.

BACKGROUND OF THE INVENTION

Yogurt is a fermented milk product manufactured by addition of appropriate lactic acid bacterial cultures to milk that is adjusted to desired fat and total milk solids levels. Sweetening agents, stabilizers, flavors, and other approved food substances can he added to give yogurt the desired physico-chemical properties. The physico-chemical properties that are normally controlled by selection of raw materials, ingredients, and process conditions include (but not all-inclusive) viscosity, water holding capacity, color, flavor, sweetness level, overall mouthfeel, smoothness, and surface appearance.

Yogurt can be manufactured by many different methods and procedures. A general outline of traditional yogurt manufacture is described below.

Milk is standardized to the desired fat level by addition or removal of fat from the raw milk.

Nonfat milk solids are increased from the 9% level generally found in raw milk to 13 to 15% by the addition of a source of nonfat milk solids (e.g. nonfat dry milk, concentrated skim milk).

Addition of sugar and other sweetening agents, flavor additives, and stabilizer(s) (or other thickening agents) to the fat and nonfat milk solids-adjusted milk.

The adjusted and additives-containing milk is heat-treated by any of several methods to pasteurize and to increase the level of denatured proteins, such process giving the final yogurt product an increased viscosity and higher water holding capacity.

The appropriately-heated yogurt milk blend is cooled to the desired incubation temperature and inoculated with lactic acid bacterial cultures (normally a blend of Streptococcus and lactobacillus genera) to increase the lactic acid content of the yogurt as these cultures metabolize lactose sugar in the milk to lactic acid.

The fermented yogurt milk is refrigerated to "complete" the lactose metabolism by the lactic acid cultures to the desired acid (or pH) level.

Although it has been known in the art to concentrate milk to increase the total and nonfat milk solids for yogurt manufacture by various water removal technologies, such as reverse osmosis, evaporation, freeze concentration and mechanical vapor recompression, the prior art has not dealt with a process that includes ultra-high temperature processing of the milk concentrate/yogurt additive blend, followed by aseptic packaging and nonrefrigerated storage for long time periods. The invention comprises reverse osmosis concentration of the fat-adjusted milk, addition of any desired substances (e.g. stabilizers, sweetening agents, thickening agents, coloring agents, flavors), ultra-high temperature processing of the yogurt milk/additive blend, aseptic packaging, and long-term storage of the yogurt milk/additive blend. The yogurt milk/additive blend can be manufactured to yogurt by addition of water to the blend to create the desired total milk solids level in the final product, warming the blend to appropriate incubation temperature, inoculating the blend with appropriate lactic acid bacterial cultures, incubating for the time period sufficient to increase the lactic acid level (i.e. reduce the product pH), and refrigerating the final product.

SUMMARY OF THE INVENTION

The present invention relates to the process to concentrate fat-adjusted milk by reverse osmosis and heat process the concentrate at ultra-high temperature to produce yogurt milk for yogurt manufacture. Appropriate and desired food additives/substances such as stabilizers, sweetening agents, flavors and/or thickening agents can be added to the milk concentrate prior to ultra-high temperature processing to commercially sterilize the complete yogurt milk/additive blend. The yogurt milk/additive blend is aseptically packaged for long-term, nonrefrigerated storage.

The concentrated, commercially-sterile yogurt milk/additive blend gives the yogurt manufacturer a more convenient and uniform "raw" material with which to manufacture the finished yogurt product. The blend will eliminate the need for a yogurt manufacturer to hold inventories of many different raw materials/ingredients. The yogurt manufacturer can order and receive custom-designed yogurt milk/additive blends that are shelf-stable (i.e. nonrefrigerated) and commercially-sterile. This is important for many reasons:

The concentrated, commercially-sterile yogurt milk/additive blend can he produced with significant amount of water removed, which can reduce the transportation costs of moving the blend to the yogurt manufacturer.

The yogurt manufacturer can hold in nonrefrigerated inventory large volumes of the concentrated, commercially-sterile yogurt milk/additive blend without fear that the blend will spoil due to unwanted microorganism growth.

The yogurt manufacturer can add an appropriate amount of water to the blend in order to give the desired total milk solids level of the yogurt product being manufactured.

The yogurt manufacturer will not have to hold in inventory many different ingredients or additives, but rather receive "just in time" the concentrated, commercially-sterile yogurt milk/additive blend.

The yogurt manufacturer will not have to give to the yogurt milk/additive blend the usually-applied high heat treatment in the yogurt manufacturing facility because the received blend will be commercially-sterile.

The production process for concentrating, heat processing, and packaging the inventive concentrated, commercially-sterile yogurt milk involves the separation of water from the fat-adjusted milk supply by pumping the milk through reverse osmosis (RO) membranes until the desired total milk solids level is achieved. Appropriate food additives/substances can be added to the concentrated milk, such as stabilizers, thickening agents, flavors, and sweetening agents. This yogurt milk/additive blend is ultra-high temperature (UHT) processed to commercially-sterilize the blend. The blend is aseptically packaged into containers as desired by the yogurt manufacturer.

The yogurt milk/additive blend has the advantage of being a "ready to use" yogurt milk/additive blend per the yogurt manufacturer specifications. All ingredients and components in the blend (milk and others) are commercially-sterilized giving the maximum level in safety to the yogurt manufacturer.

There is an increasing demand by food manufacturers to reduce their overall cost structure to be able to competitively participate in the food marketplace. A yogurt manufacturer can compete optimally in this marketplace when the manufacturer concentrates on what it does "best"—produce yogurt. Shifting the burden of raw materials reception, inventory, blending, processing, packaging, and transportation to a supplier of a ready-to-use, "just-in-time" yogurt milk/additives blend permits the yogurt manufacturer to concentrate in making yogurt, while the supplier can concentrate and perform optimally in preparing the desired and specified raw material yogurt milk/additive blend.

This inventive process removes only pure water from the fat-adjusted milk and leaves the exact proportion of all milk components (protein, fat, minerals, vitamins, carbohydrates) as in the originally-adjusted milk.

The disadvantage of prior and traditional processes in yogurt manufacture include: a cooked flavor imparted to yogurt when concentrated milk that has been evaporated is used to increase the nonfat milk solids of the yogurt milk blend; a powdery flavor imparted to yogurt when nonfat milk powder is used to increase the nonfat milk solids of the yogurt milk blend; a slight cooked flavor imparted to yogurt when yogurt milk blend is given a heat treatment of 80° to 85° C. for up to 30 minutes before yogurt manufacture.

Accordingly, the inventive process provides a process to produce concentrated, commercially-sterile yogurt milk comprising the following steps:

a. concentrating fat-adjusted milk by reverse osmosis;
 b. addition to the concentrated, adjusted milk of desired and specified food additives/substances such as stabilizers, sweetening agents, flavors, thickening agents;
 c. commercially-sterilizing the yogurt milk/additives blend at ultra-high temperature; and
 d. aseptically packaging the yogurt milk/additives blend under appropriate sterile conditions.

Water can be added to the yogurt milk/additives blend to bring the blend to the yogurt manufacturer's desired total milk solids level. If required, the diluted yogurt milk/additives blend can be pasteurized prior to inoculation with lactic acid bacterial cultures for yogurt production.

THE DRAWING

A preferred embodiment of the invention is illustrated on the accompanying drawing, in which:

FIG. 1. is a Flow Chart of Yogurt Milk Preparation Using RO/UHT Processed Milk.

DETAILED DESCRIPTION OF THE INVENTION

Figure 1:
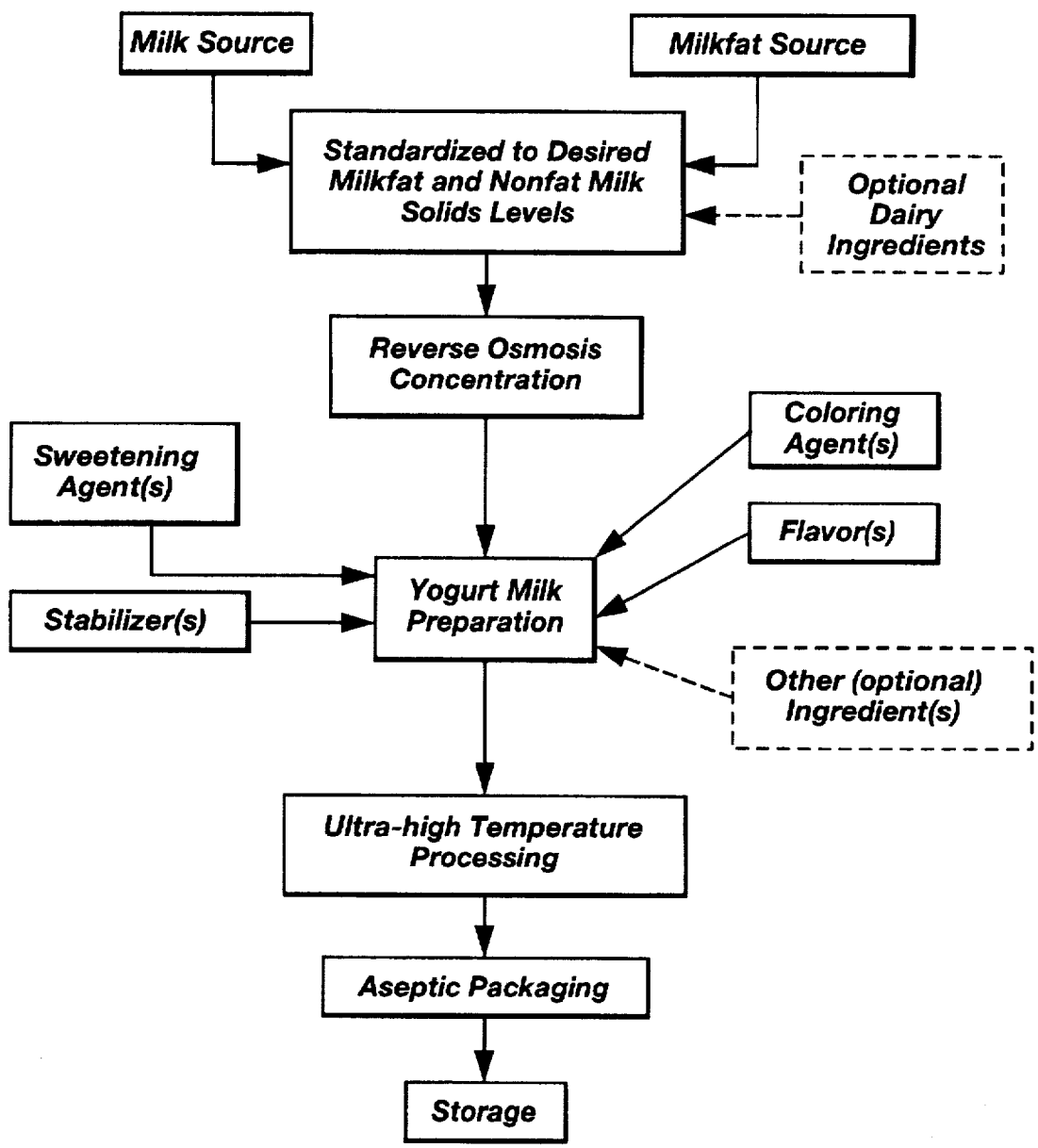

The present invention is a process to make commercially-sterile, concentrated yogurt milk/additives blend from fresh milk with desired additives for yogurt manufacture. The invention comprises: (a) concentrating fat-adjusted milk by reverse osmosis; (b) addition to the concentrated, adjusted milk of desired and specified food additives/substances, such as stabilizers, sweetening agents, flavors, thickening agents; (c) commercially-sterilizing the yogurt milk/ additives blend at ultra-high temperature; and (d) aseptically packaging the yogurt milk/additives blend under appropriate sterile conditions, yielding a "ready to use" commercially-sterile yogurt milk/additives blend for yogurt manufacture.

The raw milk to be concentrated and commercially-sterilized is adjusted to a desired fat level. For example, raw milk can have a butterfat content from 3.0 to greater than 4.0%. The fat content of raw milk depends on many factors, including season, breed of cows, nutritional adequacy of cows, stage of lactation, age of cows, and other factors. The fat content of the raw milk can be adjusted through removal by mechanical separation of cream from a portion of the whole quantity of milk as appropriately calculated. Also, cream can be removed from the entire quantity of raw milk by mechanical separation, and later blending the appropriate amount of cream to the separated "skim milk" to give an adjusted milk with the desired fat content. Yogurt milk can be adjusted to have fat levels, for example, of 3%, 2%, 1%, 0.5% or less than 0.5% fat in the finished yogurt product.

The fat-adjusted milk is concentrated by reverse osmosis by removal of pure water from the adjusted milk. All milk components are maintained at the same relative proportion as in the originally-adjusted milk. The concentration process can proceed until a desired total milk solids level is reached. Nonfat milk solids (protein, carbohydrate, minerals, vitamins) in milk is generally 9%. A fat-adjusted milk containing 2% fat, therefore, contains 11% total milk solids. This milk can be concentrated by reverse osmosis to 22% total solids (a 2 times or 2× concentration), to 27.5% total solids (a 2.5 times or 2.5×concentration), to 33% total milk solids (a 3 times or 3×concentration), or any other percent total solids level as desired. The process of removing water from adjusted milk by reverse osmosis can occur at moderately low temperatures (for example, 40° to 60° C.) thereby not imparting a cooked flavor or other off flavor(s) to the milk concentrate.

A desired yogurt product can have a final milk composition of 2% fat, and 13% nonfat milk solids. Raw milk can be adjusted to 1.38% fat with a normal level of 9% nonfat milk solids. Concentrating this fat-adjusted milk 2.89 times (a 2.89× concentration factor) will yield a milk concentrate that has 30.0% total milk solids, of which 4% is fat and 26% is nonfat milk solids. If no other food additives/substances are added, this milk can be diluted with an equal volume of water to give a yogurt milk with 2% fat and 13% nonfat milk solids. Other levels of fat can be adjusted together with appropriate levels of concentration to give different final yogurt compositions.

Food additives/substances to improve overall yogurt properties are generally added to the yogurt milk before heat treatment. Substances such as stabilizers and thickening agents (e.g. modified food starch) are used to increase the viscosity and thickness of the finished yogurt product. Sweetening agents (natural or synthetic) are also added to reach a desired sweetness level in the finished product. Flavors can be added to a desired level. These various additives/substances must be added to the yogurt milk prior to heat processing in order to properly pasteurize the entire yogurt milk/additive blend.

The yogurt milk/additive blend may be commercially-sterilized by any sterilization method as long as the balance of all elements of the blend except water is not adversely disturbed. It is preferable that the yogurt milk/additive blend be commercially-sterilized by a continuous ultra-high temperature process wherein the blend is passed over one or more heat exchangers or is sterilized by a steam-heating process. Heating temperatures and holding times are selected as appropriate to commercially-sterilize the blend, and as appropriate to the equipment in use. A preferred ultra-high temperature and holding time combination includes 138° C. at a minimum of two seconds.

The inventive process offers several advantages including improved energy efficiency in the concentration and commercial-sterilization steps. High levels of concentration (for example 2 times or greater) gives the advantage of reduced transportation costs of the yogurt milk/additive blend from the concentration/sterilization facility to the yogurt manufacturing facility. Another advantage is that the commercially-sterile yogurt milk/additive blend does not require refrigeration during transportation and warehouse storage.

The commercially-sterile yogurt milk/additive blend can be aseptically packaged in a variety of package types and sizes. For example, the blend can be aseptically packaged in approved (for low acid products) flexible containers that hold up to 300 gallons (approximately one metric ton). The commercially-sterile blend in such large flexible containers can be directly pumped from the container to a desired location in the yogurt manufacturing facility.

The process of the invention is new and useful. The commercially-sterile yogurt milk/additive blend c(an be stored at room temperature without spoilage due to contaminating microbial growth. The commercially-sterile yogurt milk/additive blend can be stored at temperatures other than room temperature without adverse effects on the blend. The commercially-sterile yogurt milk/additive blend can be diluted with water to the desired and appropriate total milk solids/additives level to continue in the yogurt manufacturing process.

EXPERIMENTAL WORK LEADING TO THE INVENTION

As a first step in the research that led to the invention, a non-cellulosic reverse osmosis membrane, identified at Type ZF 99, was obtained from the Damrow Company of Fon Du Lac, Wis. The membrane was manufactured by Patterson Candy International, Ltd.

In the example reported below, 100 gallons of 1.40% fat-adjusted milk (with 9% nonfat milk solids) was reverse osmosis-concentrated 2 times (2× factor) using this membrane. The fat-adjusted milk was heated to approximately 50° C. before and during reverse osmosis concentration. Heating the milk, though not a requirement of the process, allowed the milk to be concentrated more efficiently and faster. The final total solids of the concentrate was 20.8%.

After concentrating the fat-adjusted milk, appropriate stabilizer and sweetening agents were added, each to a 2 times (2× factor) normal concentration level. For example, stabilizer was added at a 0.2% level and sugar was added at a 7% level.

The yogurt milk/additive blend was ultra-high temperature processed to commercial sterility by direct steam injection, followed by flash evaporation, aseptic homogenization, and cooling. The blend was aseptically-packaged in pre-sterilized, four-ounce (125-milliliter) plastic containers.

After storage at room temperature of the yogurt milk/additive blend, yogurt was manufactured from the concentrate by adding a one part of sterile water (e.g. 40 grams) to a 2.5 parts volume (e.g. 100 grams) of yogurt milk/additive blend. The diluted blend had approximately 13% nonfat milk solids, 2% fat, 5% sugar, and 0.14% stabilizer levels.

After warming the blend to approximately 40° C., yogurt culture was added at 2% level and mixed thoroughly. The diluted and inoculated yogurt milk/additive blend was incubated at 40° C. until a pH level of 4.8 to 4.9 was reached (approximately 3 to 4 hours). The yogurt sample was removed from the incubator and refrigerated at 4° C. overnight. The final product pH level was within the range of pH 4.2 to 4.5.

As additional embodiments of the invention, fat-adjusted milk can be concentrated to levels higher than 2 times (2× factor). The fat-adjusted milk can be concentrated to levels as high as approximately 3 times (3× factor) by removing more water through the reverse osmosis membranes. Addition of food additives/substances can be made to the milk concentrate proportional to the expected dilution of the concentrate with water to reach the desired yogurt composition.

Additional experimental data were recorded by using the inventive process to concentrate skim milk to different concentration factors without the use of food additives/substances such as stabilizers, sweetening agents, thickening agents, or flavors. Skim milk (approximately 0.1 % fat and 9% nonfat milk solids) was concentrated to 2 times (2× factor) and 2.5 times (2.5x factor) by reverse osmosis at approximately 50° C. The skim milk concentrate was ultra-high temperature processed by direct steam injection by heating to 140° C. and holding for 4 seconds. The commercially-sterile skim milk concentrate was cooled and aseptically-packaged in pre-sterilized, four-ounce (125-milliliter) plastic containers. The containers were stored at room temperature for 12 weeks. At two-week intervals, the skim milk concentrate was diluted with appropriate level of water to give a diluted yogurt milk with 13% nonfat milk solids. The diluted yogurt milk was warmed to approximately 40° C. and inoculated with 1.5% or 2.5% yogurt culture blend. The inoculated samples were incubated at approximately 40° C. for up to 270 minutes. The decrease in pH level (increase in lactic acid concentration in the yogurt milk) was measured. At pH level of 4.9 to 5.0 in the yogurt milk, the sample was removed from the incubator and placed in a refrigerator at 4° C. After cooling overnight, the final product pH was measured. The final product pH was within the range of 4.3 to 4.5.

The finished yogurt product had a firm consistency with little or no synthesis ("weeping" or "wheying off" as evidenced by water droplets or pools on the product surface). Samples did not indicate any defects such as splitting, separation from the container walls, gas bubbles, or graininess. Though not as firm a yogurt product as would be expected from a product that contains stabilizer and/or thickening agent(s), the yogurt samples of commercially-sterile, concentrated skim milk were acceptable.

What is claimed:

1. Method for manufacturing yogurt milk mix comprising the steps of:

adjusting the fat content and non-fat milk solids of milk to produce an adjusted milk;

concentrating said adjusted milk by reverse osmosis to produce a concentrated adjusted milk;

adding to said concentrated adjusted milk a defined amount of at least one food additive to produce a yogurt milk mix;

commercially sterilizing said yogurt milk mix at an ultra-high temperature and for a sufficiently long holding time to produce a commercially sterile yogurt milk mix; and packaging said commercially sterile yogurt milk mix under aseptic conditions in a pre-sterilized container for storage under non-refrigerated conditions.

2. A method as set forth in claim 1, wherein the ultra-high temperature is at least 138° C.

3. A method as set forth in claim 1, wherein the holding time for commercial sterilization is two seconds.

4. A method as set forth in claim 1, wherein the food additive is a thickening agent.

5. A method as set forth in claim 1, wherein the food additive is a stabilizer.

6. A method as set forth in claim 1, wherein the food additive is a sweetening agent.

7. A method as set forth in claim 1, wherein the food additive is a flavor.

8. A method as set forth in claim 1, wherein the food additive is a coloring agent.

* * * * *